Nov. 10, 1970  K. H. BILLINGS  3,539,865

CROWBAR PROTECTION DEVICE

Filed May 15, 1969

Keith H. Billings
INVENTOR

BY
Lawrence E. Laubscher
ATTORNEY

United States Patent Office 3,539,865
Patented Nov. 10, 1970

3,539,865
CROWBAR PROTECTION DEVICE
Keith Hugh Billings, Charlwood, England, assignor to Roband Electronics Limited, Charlwood, England
Filed May 15, 1969, Ser. No. 824,957
Claims priority, application Great Britain, Nov. 12, 1968, 53,571/68
Int. Cl. H02h 3/20
U.S. Cl. 317—16
9 Claims

ABSTRACT OF THE DISCLOSURE

The specification describes crowbar protection apparatus in which a current control device is arranged to pass a current proportional to any excess in the output voltage above a first predetermined threshold and a switch operative when the output voltage exceeds the second and higher threshold level to draw from a source of current sufficient to actuate an over-current protection device.

---

This invention relates to protective devices for power supply equipment and is particularly concerned to provide an arrangement whereby damage to semiconductor circuits resulting from excessive supply voltages may be prevented.

It is well known that circuits employing semiconductor devices are very susceptible to damage if the voltage of the direct current source to which the circuits are connected should rise even for a relatively brief period to a value substantially higher than the nominal voltage. To overcome this difficulty it has been proposed to employ what is known as "crowbar" protection, in which a rise in the applied voltage beyond a pre-set limit results in the short-circuiting of the supply, with consequent disconnection from the supplied apparatus either by the blowing of a fuse or by the operation of a circuit-breaker (usually electronic).

As a result of switching surges in the alternating current mains from which the supply voltage for the semiconductor apparatus is usually derived, it is common for transient increases in supply voltage to occur, the duration of which is not sufficient to cause damage. If the protective device removes the supply in response to every such transient a large number of unnecessary supply shutdowns would result. It is therefore known to provide a delay means which prevents the operation of the preventive device unless the increase in supply voltage persists for a predetermined minimum period.

This known arrangement suffers from the disadvantage that a delicate compromise must be obtained between the accceptable number of shutdowns, which increases as the length of the delay is reduced and the risk of damage to the supplied apparatus which increases as the delay is increased.

The present invention provides crowbar apparatus which overcomes the necessity for compromise between opposing requirements.

The invention also provides a crowbar protective device including a first current path drawing a current increasing in proportion to any excess above a first threshold value of the voltage appearing between supply lines and a second current path responsive to any excess of said supply voltage above a second, and higher, threshold level to pass a current capable of actuating an over-current protection device included in the source of said supply voltage.

Figure 1:
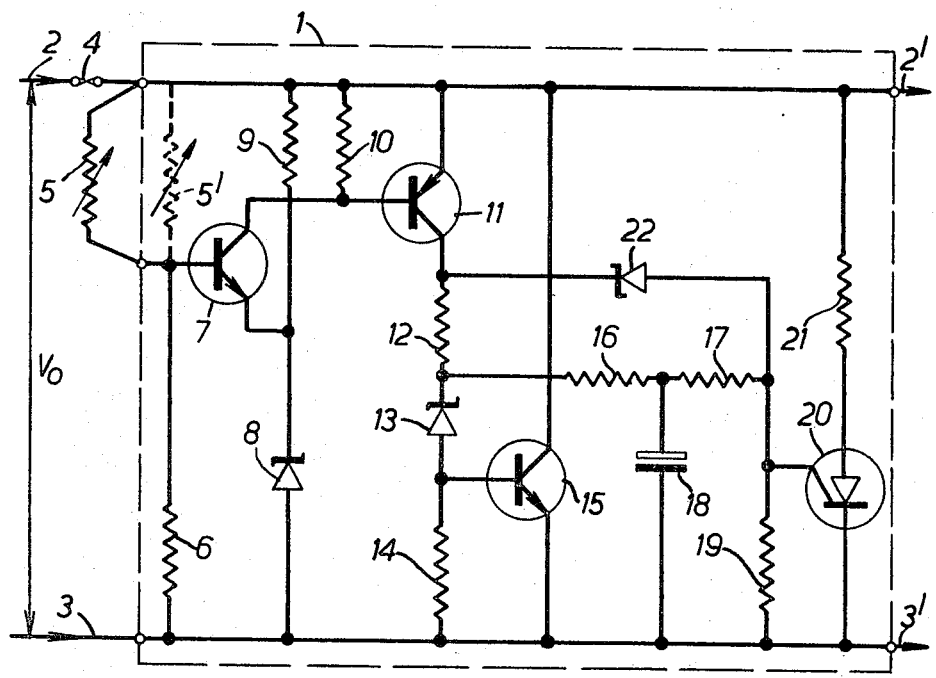

Features and advantages of a protective device according to the invention will become apparent from the following description of an embodiment thereof, taken in conjunction with the accompanying drawing, of in which:

FIG. 1 is a circuit diagram of a embodiment of protective device; and

Figure 2:
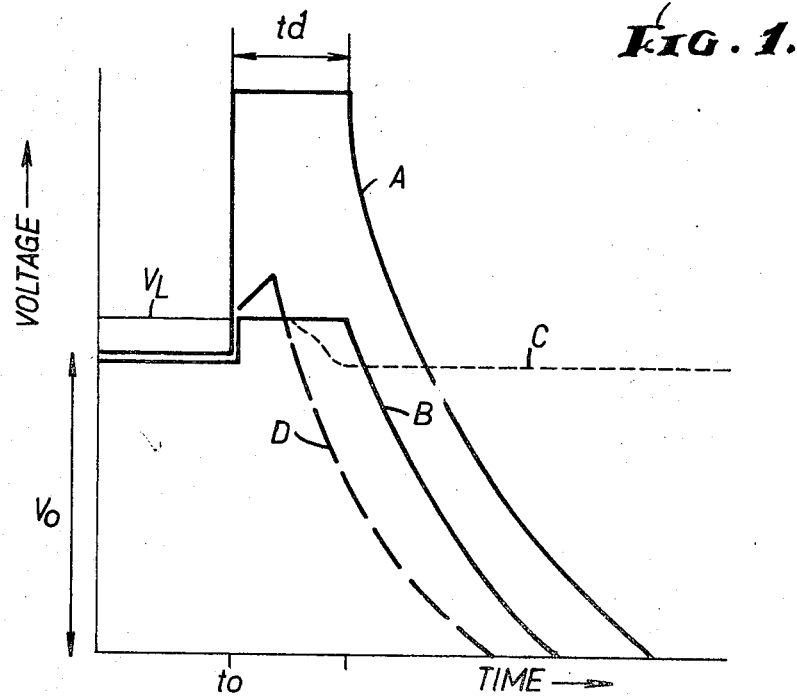

FIG. 2 comprises graphs illustrating the performance of known apparatus and of a device according to the invention.

The apparatus shown enclosed within broken line 1 in FIG. 1 is a protective device which is shown as connected in supply leads 2, 2' and 3, 3' by which current is fed to semiconductor apparatus from a power supply unit driven by alternating current mains. Lead 2 contains a fuse 4. Since the input and output terminals of device 1 are seen to be directly connected within the device, it will be understood that one pair of terminals only is necessary to connect the apparatus to the supply leads.

A further terminal is advantageously provided for the external connection of an adjustable resistor 5, though this may be included within the device proper if desired, as shown in broken line at 5'. If an external resistor is employed, the advantage is gained that the remaining apparatus may be wholly encapsulated.

Resistor 5 (or 5') is connected in series with a fixed resistor 6 across the supply lines and the potential at the junction of these resistors is applied to the base of a transistor 7, which therefore is connected to a circuit point having a potential with respect to one of said terminals which is a predetermined fraction of the potential applied between said terminals. The emitter of transistor 7 is connected to a circuit point having a predetermined voltage offset with respect to the other of said terminals. Specifically, in the present embodiment the emitter of transistor 7 is held at a predetermined potential above that of supply line 3, 3' by a Zener diode to which current is fed through a resistor 9. The emitter of transistor 7 is connected to the junction of resistor 9 with Zener diode 8. Transistor 7 will thus pass current only when the potential at its base exceeds that at its emitter by the turn-on voltage Vbe (usually some 0.5 v.). Therefore if $V_{z1}$ be the voltage drop across Zener diode 8, R be the value in kilohms of resistor 6, and $V_o$ be the nominal supply voltage, then resistor 5 should have a value $R_a$ given by the equation $$R_a = \frac{(V_o - V_{z1} - Vbe)R_6}{V_{z1} + Vbe}$$

or $R_a = (V_o - R) \times 1000$ ohms for the special case where $R_6$ in $K\Omega = V_{z1} + Vbe$ as in FIG. 1.

When transistor 7 passes current a voltage drop will occur in a load resistor 10 through which the collector of the transistor is returned to supply line 2–2'. This voltage drop is applied directly to the base of a second transistor 11, in this case a p-n-p transistor, of which the emitter is connected directly to supply line 2–2' and the collector is returned to supply line 3–3' by way of the series combination of a resistor 12, a second Zener diode 13 and a further resistor 14. The junction between the anode of Zener diode 13 and resistor 14 is connected directly to the base of a third transistor 15, an n-p-n transistor, of which the emitter and collector are respectively connected directly to the 3–3' and 2–2' supply lines. Thus as transistor 7 passes current in response to an increase in supply voltage above the nominal value $V_o$, transistor 15 will pass an increasing current which, as a result of the inevitable internal series resistance of the supply unit, will prevent any large increase in the voltage between the supply lines.

At the same time a voltage, which is greater than that applied to the base of transistor 15 by the voltage offset $V_{z2}$ provided by second Zener diode 13, is applied by way of a time-delay circuit including series-connected resistors 16, 17 and shunt capacitor 18. The output of time-delay circuit 16, 17, 18 is connected to earth by way of a resistor 19, the voltage appearing across which is applied to the trigger electrode of a crowbar semiconductor controlled rectifier (SCR) 20, which is connected across the supply in series with a current-limiting resistor 21. The current passed by SCR 20 and resistor 21 is chosen to ensure the blowing of fuse 4 and hence the disconnection of supply. The value of resistor 21 is chosen in relation to the permissible value of I²T for the SCR and the blowing time of the fuse.

Resistor 12 in the collector circuit of transistor 11 has a low value and under other than catastrophic conditions has no effect upon the operation of the circuit as above described. However, should a very large rise in the output voltage of the power unit occur, for example as a result of a breakdown in a stabilizer included in that unit, then the voltage at the collector of transistor 11 will rise substantially above that at the cathode of Zener diode 13 and this voltage rise will be passed through a third Zener diode 22 to the trigger electrode of crowbar SCR 20, which is thus immediately turned on, reducing the supply voltage to zero by blowing fuse 4.

The action of the device of which the circuit arrangement has been described above in relation to FIG. 1 is now described and contrasted with that of a known device, referring to the graphs given in FIG. 2 of the drawing.

The graphs shown in FIG. 2 illustrate voltages appearing across a protective device plotted as ordinates against time as abscissae. In each case it is assumed that at time $t_0$ an abrupt increase occurs in the voltage, nominally $V_0$, which is applied to the device.

Curve A illustrates the performance of a known delayed-crowbar protective device, which permits the voltage to rise to an arbitrary value for a delay period $t_d$ and then short-circuits the supply lines to produce an abrupt fall to zero in the supply voltage, after which the device must be manually re-set to restore the supply.

Curve B illustrates the corresponding performance of the device described in relation to FIG. 1. It will be seen that the supply voltage rises only by a small amount to a limiting value $V_L$, being restrained by the additional current passed by shunt-regulator transistor 15, and at the end of the delay period $t_d$ the voltage is removed as crowbar SCR 20 is turned on.

If, during the delay period, the excess voltage ceases, then the supply will be restored from limiting voltage $V_L$ to the nominal voltage $V_0$, as indicated by broken-line curve C.

Finally, if a catastrophic voltage rise occurs, for example, as a result of a breakdown in the power supply equipment, the accelerated trip action will come into play, so that the voltage follows the heavy broke-line curve D.

Values suitable for use in the circuit arrangement of FIG. 1 are as follows.

Resistors:
  6—5.6 kilohms
  9—1 kilohms
  10—270 ohms
  12—10 ohms
  14—100 ohms
  16—100 ohms
  17—47 ohms
  17—1 kilohm
  21—0.25 ohm
Capacitor:
  18—10µf.

Transistors:
  7—2N929
  11—2N4036
  15—2N3055
SCR:
  20—12RCM5 (I.R.)
Zener diodes:
  8—$V_{z1}$=5.1 v.
  13—$V_{z2}$=3.3 v.
  22—$V_{z3}$=5.1 v.

I claim:

1. In a crowbar protection system including terminals adapted for connection with a direct-current voltage source liable to voltage changes, and a current-control device responsive to any excess over a predetermined voltage level of a voltage applied to said terminals to draw increased current therefrom, the improvement comprising: a current control device passing a current proportional to an applied control voltage;
a first current path between said terminals including said current control device;
first control means including first threshold means responsive to an applied voltage to provide a first output voltage representing any excess over a first predetermined voltage level of said applied voltage;
circuit means applying to said first control means any voltage received at said terminals;
circuit means applying said first output voltage to said current control device as said control voltage whereby said first current path passes an increasing current as said voltage applied to said terminals increases above said predetermined voltage level;
switch means operable by an applied voltage to close an electric circuit;
a second current path including said switch means between said terminals;
second control means coupling said first output voltage to said switch means, said second control means including delay means delaying an applied voltage by a predetermined delay time, whereby said switch means is operated to close said second current path when and only when said voltage applied to said terminals exceeds said predetermined voltage level for at least said predetermined time.

2. The improvement defined by claim 1, wherein said second control means includes also second threshold means coupling said output voltage to said switch means whereby said switch means is operated also if said applied voltage exceeds a second predetermined threshold level higher than said first threshold level.

3. The improvement defined by claim 1, wherein said current control device includes a first transistor of predetermined conductivity type having a base electrode, an emitter electrode and a collector electrode, said collector and emitter electrodes each being coupled to a respective one of said terminals and said circuit means applying said first threshold means output voltage to said base electrode.

4. The improvement defined by claim 3, wherein said first control means includes a second transistor of the same conductivity type as said first transistor, said second transistor having a base electrode, an emitter electrode and a collector electrode; a first resistor connecting said collector to a first one of said terminals; first resistance voltage divider means having a tapping; second voltage divider means including the series combination of a second resistor and a first Zener diode having a predetermined Zener breakdown voltage; circuit means connecting each of said first and second voltage divider means between said terminals; circuit means connecting one of said base and collector electrodes to said voltage divider tapping and circuit means connecting the other of said base and collector electrodes to the junction of said second resistor with said first Zener diode, whereby said second transistor becomes conductive when the potential at said first voltage divider tapping exceeds the voltage at said junction thereby to develop on said collector electrode of said second transistor a derived voltage representing the excess of said applied voltage over said Zener breakdown voltage, and means coupling said derived voltage to said base electrode of said first transistor.

5. The improvement defined by claim 4 wherein said means coupling said derived voltage to said base electrode of said first transistor includes a third transistor having a base electrode, an emitter electrode and a collector electrode, said third transistor being of the conductivity type opposite to that of said first and second transistors, means coupling said third transistor base electrode to said second transistor collector electrode; means coupling said third transistor collector electrode to one of said terminals; means including a third resistor coupling said third transistor collector electrode to the other of said terminals, whereby there appears at said third resistor a control voltage representing said excess of said applied voltage over said Zener breakdown voltage; and means coupling said control voltage to said first transistor base electrode.

6. The improvement defined by claim 5, wherein said switch means includes a solid-state controlled rectifier having main electrodes and a control electrode, said rectifier establishing a controlled conductive path between said main electrodes in response to a voltage of predetermined polarity applied to said control electrode and a resistor coupling said control electrode to one said main electrode; said second conductive path includes said controlled conductive path coupled in series with a fourth resistor between said terminals, and said second control means includes a second Zener diode coupled in series combination between said third resistor and said third resistor collector electrode, delay circuit means having an input terminal and an output terminal, said delay means providing at said output terminal an output voltage delayed by a predetermined time interval with respect to an input voltage applied to said input terminal; circuit means coupling the voltage appearing on said series combination of said second Zener diode and said third resistor to said solid-state rectifier control terminal.

7. The improvement defined by claim 6 wherein said second control means includes a fifth resistor coupled in further series combination with said second Zener diode and a third Zener diode coupling the voltage appearing at said third transistor collector to said solid-state rectifier control electrode.

8. Apparatus as defined in claim 1, wherein the value of current drawn by said first current path in response to said first output voltage is so related to the internal resistance of said voltage source that source voltages in excess of said predetermined voltage level are substantially prevented.

9. Apparatus as defined in claim 1, wherein said crowbar protection system includes output terminals adapted for connection with an over-current protection device including a current path therethrough, and means responsive to current in excess of a predetermined value for interrupting said current path; and further wherein the current drawn by said second current path when conductive exceeds that necessary to actuate said over-current protection device.

References Cited
UNITED STATES PATENTS 3,192,441   6/1965   Wright.
3,371,262   2/1968   Bird et al. -------- 321—14 X JAMES D. TRAMMELL, Primary Examiner H. FENDELMAN, Assistant Examiner U.S. Cl. X.R.

317—31, 38; 323—8